Feb. 24, 1931.　　　E. V. CAMP　　　1,793,673
RESILIENT TRAFFIC GUARD
Filed Oct. 13, 1928　　　3 Sheets-Sheet 1
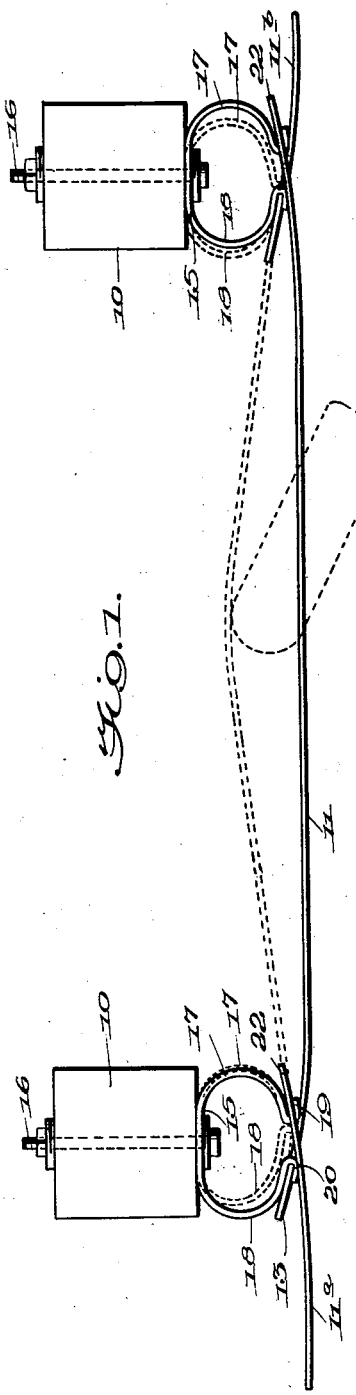
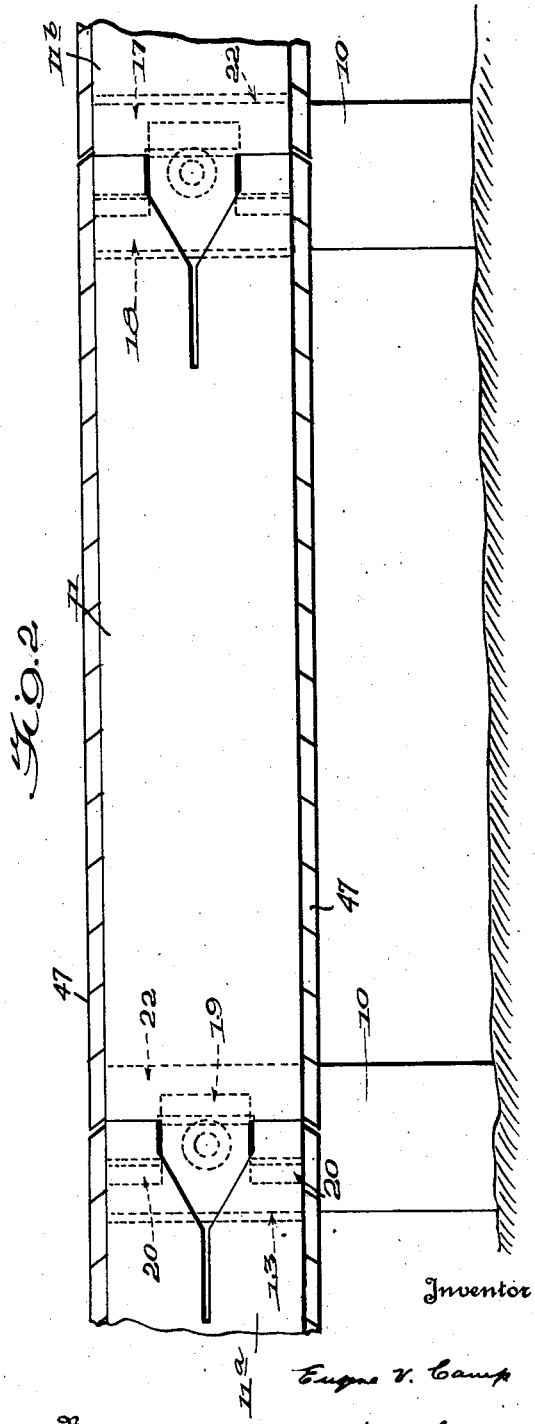
Inventor
Eugene V. Camp
By O'Neill & Buan
Attorneys Feb. 24, 1931.  E. V. CAMP  1,793,673
RESILIENT TRAFFIC GUARD
Filed Oct. 13, 1928  3 Sheets-Sheet 2
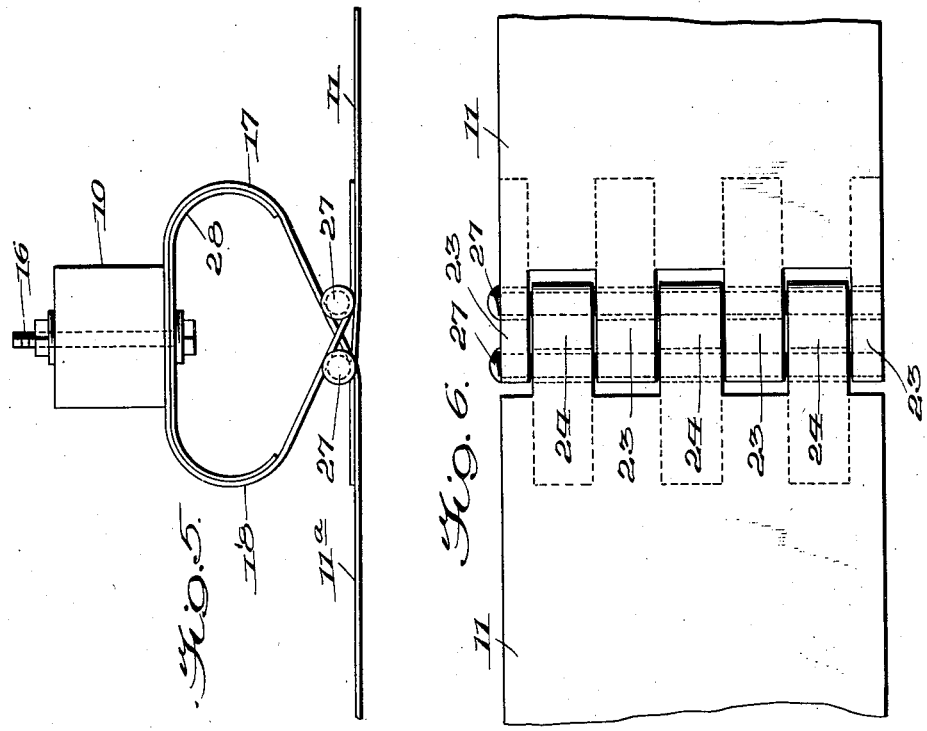
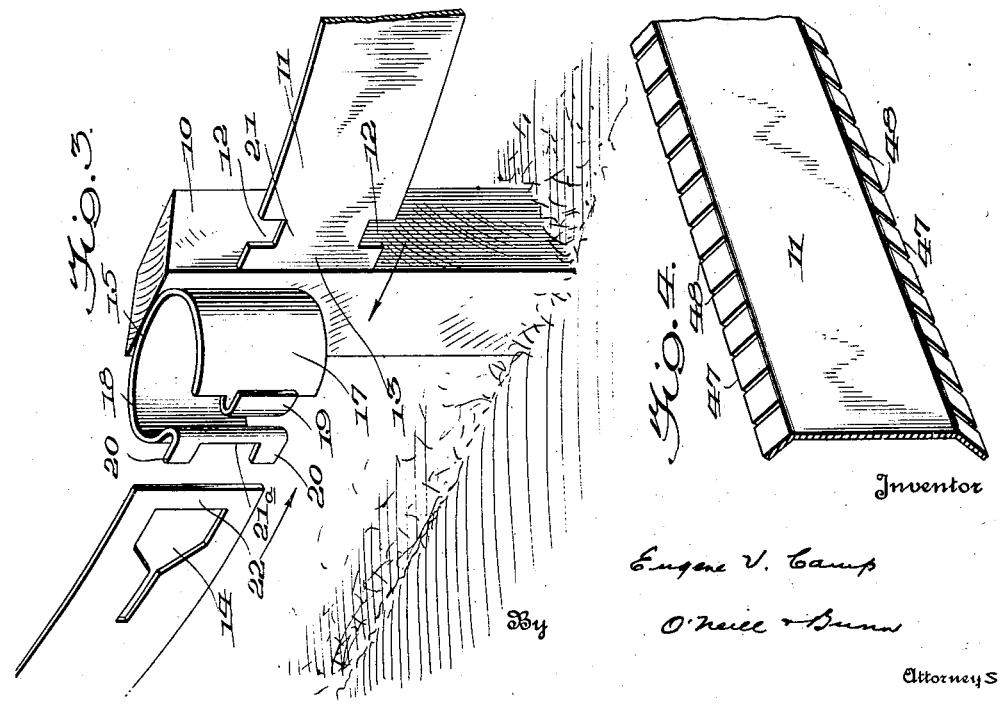

Feb. 24, 1931.  E. V. CAMP  1,793,673
RESILIENT TRAFFIC GUARD
Filed Oct. 13, 1928  3 Sheets-Sheet 3
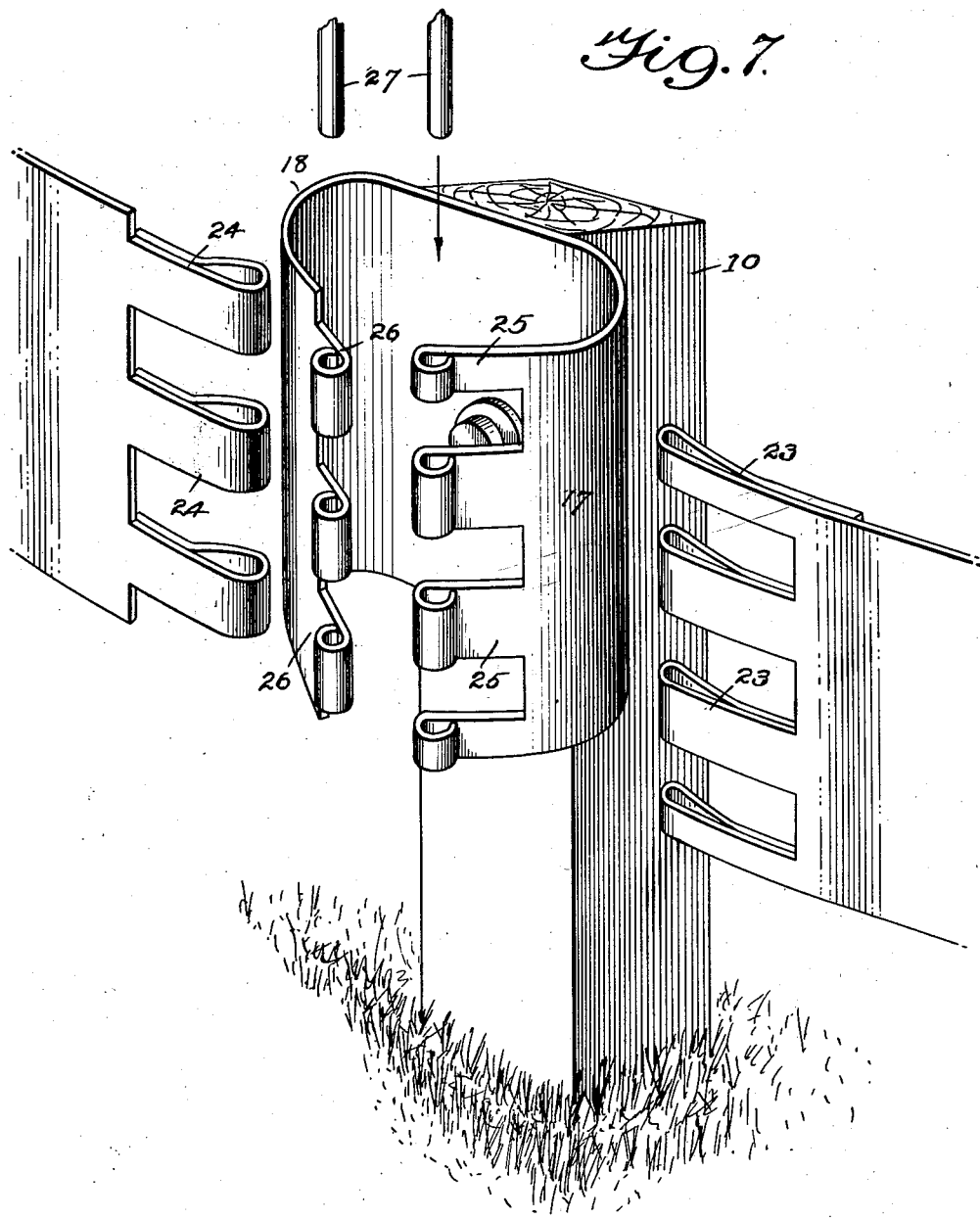

Patented Feb. 24, 1931

1,793,673

UNITED STATES PATENT OFFICE

EUGENE V. CAMP, OF ATLANTA, GEORGIA

RESILIENT TRAFFIC GUARD

Application filed October 13, 1928. Serial No. 312,234.

This invention relates to new and useful improvements in the assembly and installation of members positioned to receive, and adapted to partially nullify, the impact force of a moving vehicle. The structure forming the subject matter of this application is especially adapted for use as a highway guard erected at dangerous points along a roadway, and is herein so disclosed, but it is to be understood that its application is not limited to this specific utility.

It is broadly old in the prior art to provide highway guards which depend upon the inherent resiliency of the guard member in the absorption of shocks under the impact of a moving vehicle, but, in such devices, the shock must be resiliently absorbed within such strictly prescribed confines of the member, that the force of the impact either ruptures the latter, or fails to so properly cushion the shock as to avoid great damage to the contacting vehicle, very often causing injury to the occupants thereof.

The primary object of the present invention is the provision of a shock-absorbing guard under constant tension, and composed of a plurality of inherently resilient impact members arranged in substantial longitudinal alignment, and so connected, each to each at the ends, that an impact force against one of said members will be communicated to the connected resilient members adjacent each end thereof, thereby permitting each member in the train of connected elements, to absorb its quota of the shock.

Another object of the invention is the provision of a resilient element, secured to a fixed support, and connecting the ends of adjacent impact members, whereby each connector element may add its inherent resilience as a factor in the absorption of any impactive force directed against any one of said members.

Other objects of the invention will be made apparent in the following specifications, when read in connection with the drawings forming a part thereof.

In said drawings:

Fig. 1 is a top plan view of the guard, showing one of said members operatively connected at each end to similar members.

Fig. 2 is a side view of the guard shown in Fig. 1.

Fig. 3 is a perspective view of the guard members in unassembled condition.

Fig. 4 is a fragmentary perspective view showing one of said members having beveled top and bottom edges.

Fig. 5 is a top plan view of the supporting post and a modified form of resilient connector element.

Fig. 6 is a side elevation of the structure shown in Fig. 5.

Fig. 7 is a perspective view of the disassembled structure illustrated in Fig. 5.

Referring specifically to the drawings which show the embodiment of this invention in a guard adapted for installation at dangerous points on a highway, 10 indicates a supporting post, several of which are positioned alongside the road to be protected, and between which are supported the rail members 11, 11. In the structure illustrated in Figs. 1 to 3 inclusive, the rails 11 are formed of resilient plate metal, each rail being provided, adjacent one end and on its upper and lower edge, with a squared notch 12, resulting in a T-shaped end 13. The other end of the rail is apertured to provide a passage 14, large enough to easily permit passage therethrough of the T-shaped end of the adjacent rail, it being understood that a plurality of such rails are positioned in alignment along the highway, the T-shaped end of one rail being laced through the opening in the end of the adjacent rail.

Novel means are provided for resiliently connecting the ends of the rails to the supporting posts 10. In the structure shown in Figs. 1 to 3, I provide a connector 15, constructed of spring metal and substantially cylindrical in formation, as best illustrated in Fig. 3. The connector 15 may have its central body portion secured directly to the post 10, by means of detachable bolts 16 provided with the customary washer and bolt, or it may be screwed or otherwise rigidly secured to the post. Each connector 15 is shown, in Figs. 1 to 3, as provided with outwardly extending resilient wing portions 17 and 18, the wing 17 being provided at the middle of its vertical edge with an integral rearwardly turned hook 19, the parallel edge of the wing 18 being similarly provided with a double hook 20. In the assembly of the structure as just described, the T-shaped end 13 of one rail 11 is passed through the opening 14 in the end of the adjacent rail, and so positioned that the projections forming the T are located in contact with the rear faces of the hooks 20, 20, the reduced shank 21, defined by the slots 12, 12, fitting into the opening between said hooks 20, and bearing against the edge 21$^a$. The end 22 of the opposite rail is then pulled over and positioned behind the hook 19.

In assembling the elements as explained, along the sides of the highway to be protected, it is understood that the rails 11 are vertically positioned at that distance above the ground best suited to receive a contact by portions of an automobile or other vehicle. Each rail is stretched tightly in position and, under impact from a moving vehicle, its natural resiliency tends to absorb the shock, and to cause the impacting body to rebound to or be deflected towards the highway. In addition thereto however, it is to be noted that the vertical edges of the wings 17 and 18, of the resilient connectors 15, are spaced apart, and that an impact on any rail will exert a pull on one of said wings 17 or 18, and tend to draw it towards the other wing, thereby adding its increment of resiliency in shock absorption. If the impact is of sufficient violence, it will entirely close the space between the vertically parallel edges of the wings 17 and 18, causing one of said edges to contact, through the rail members, the edge of the adjacent wing, thereby flexing the latter and utilizing the inherent resiliency of both wings, and of two or more connected rails, in the absorption of an impact force against one rail.

Fig. 1 discloses the action of the assembled guard, under the force of an impact, the full lines showing the normal position of the elements, and the dotted lines the positions to which said elements are shifted under the impactive force. In this view the rails are indicated, for convenience of reference, by 11, 11$^a$ and 11$^b$. The blow being delivered to the rail 11 causes a pull to be exerted on the hooks 20, 20, integral with the wing 18 of the connector 15. As here indicated the impact was of sufficient force to cause the hooks 20 to move to the right sufficiently to contact the inner face of the hook 19, thereby flexing the wing 17 to the right, and causing it to pull on the end 22 of the rail 11$^a$. Such action manifestly tends to tighten the rail 11$^a$, and permits it to add its inherent resiliency, augmented by the action of the connector at its left hand end, (not shown), in the shock absorption. Obviously, a similar action takes place with the connector 15, and the rail 11$^b$, shown at the right of the drawing, the directional movement of the wings 17 and 18 being reversed, but forcing the rail 11$^b$, and the connector 15 at its other end, to co-operate in absorbing the shock. From the foregoing it is manifest that, by properly regulating the space between the parallel vertical edges of the wings 17, 18 of the connectors 15, with respect to the known co-efficient of resiliency of the connectors and the rails, all of the connectors and rails may be utilized in the absorption of violent contacts to any rail, lighter impacts being absorbed by adjacent rails and the connectors 15 to which they are secured. The shape of the spring connectors permits them to yield both laterally and in a direction normal to the post or support on which they are mounted, so that an impact delivered to a connected rail or panel substantially at the joint will be largely taken up by the compression of the connector, which will also transmit the stress to the adjacent rails.

It will be observed that with a single bolt attaching the spring or connector 15 to post 10 that the spring is free to revolve on said bolt and align itself with the rails, and that in erecting over vertical curves that the top or bottom portions of the springs 15 will expand to compensate for the vertical angularity between rails 11 where they join.

It will also be noted that the end of one rail passes through one end of the other in such a manner that all ends are on the back side (opposite the impact face), leaving a smooth surface which will not entangle contacting vehicles and which will allow them to glide along the surface of the rail with little or no damage to vehicle, occupant of vehicle, or rail.

It will also be manifest that the ends of the rails are so interlocked that if any connector 15 is entirely destroyed, the rails will remain intact and continuous.

Figs. 5, 6 and 7 show a structure employing the same principle of operation as above described, the co-operating elements being structurally different however. In this embodiment of the invention both ends of each rail 11 are provided with a plurality of integrally-formed tongues, here shown as four tongues 23 at the front end, and three tongues 24 at the rear. The connector element 15 is practically the same as heretofore described, and is similarly secured to the supporting post 10, but the wing 17 is provided with four integral tongues 25, separated by spacing slots permitting the passage therethrough of the tongues 24 on the front end of the rail 11, and the wing 18 is similarly provided with three tongues 26 spaced apart to permit the passage of tongues 23 on the rear end of one of the rails 11. All of the tongues 23, 24, 25 and 26 are turned or folded backwardly at the end, to provide sockets for the reception of pintle pins 27. In this structure, as in the embodiment illustrated in Figs. 1 to 3, it is to be noted that the end of one rail 11, that is the tongues 23, pass through the slots defined by the tongues 24 in the rail 11ª, and are pivotally connected to the tongues 26, on the wing 18, the tongues 24 on the rear end of the adjacent rail being similarly pivoted to the tongues 25, carried by the wing 17. While the principle of operation involved is broadly similar to that of the structure depicted in Figs. 1 to 3, it is apparent that the tongues 25 and 26, on the wings 17 and 18, respectively, may be of any dimensions desired to attain the necessary refinement of flexibility. In this structure an impact delivered to the rail 11, Fig. 5, will first cause flexure of said rail, and at the same time bend the tongues 26 and wing 18. If the force is sufficiently strong the tongues 26 and wing 18 will be flexed until the sockets carrying the pintles 27 will contact, thereby bending the tongues 25 and wing 17 to the right, and exerting a pull on the rail 11ª, as will be understood. In this structure one or more supplemental leaf springs 28 may be utilized if desired, as illustrated in Fig. 5.

In all cases where sheet metal rails 11 are provided, I prefer to bevel the edges thereof, or bend said edges backward from the face of the rail, this being especially true of the top edge. Such structure is illustrated in Figs. 2 and 4, the top and bottom of the rail being in the form of rearwardly directed flanges 47, provided with a plurality of slits 48. This structure is for the purpose of guarding against serious injury to an occupant of an automobile, if thrown upon the top of the rail as a result of an impact. The slits 48 serve to maintain the normal resiliency of the rail.

From the foregoing it will be obvious that I have provided a traffic guard which may be economically manufactured and installed and which, in operation, provides a surface exposed to traffic and supported at the desired vertical distance above the ground. The impact members or rails herein described are so constructed and supported under constant longitudinal tension imposed by the wings 17 that they will deflect traffic striking the rails at an angle and resiliently urge it back to the normal course. It will be manifest that, in the resilient connectors 15, I not only provide means for spacing the rail from the supporting posts, thereby greatly minimizing the danger when a vehicle strikes the rail directly opposite a post, but that said connectors also support the rail in the proper vertical position, and create horizontal tension in the rails and add their increment of resiliency no matter where the contacting force is applied to the rail. The rails are so constructed that they present a maximum surface toward the roadway, which when galvanized, painted or otherwise made conspicuously bright will be rendered clearly visible during travel by night.

Modifications of the structures herein disclosed may be suggested to those skilled in the art, but my invention covers all embodiments falling fairly within the scope of the appended claims.

I claim:

1. A guard of the class described, comprising a pair of impact members arranged in operative alignment, the end of one member being interlaced through the adjacent end of the other member, and a connector element secured in position laterally of said members, and provided with two resilient arms each of which is connected to one of said interlaced ends.

2. A guard of the class described, comprising a plurality of impact members arranged in operative alignment, the end of each member, throughout the alignment, being interlaced through the proximate end of the next adjacent member, and a plurality of connector elements each secured in position laterally of and adjacent the interlaced meeting ends of said members, said elements being provided with resilient arms each of which is operatively connected to one of said ends.

3. A guard of the class described, comprising a plurality of impact members arranged in operative alignment, the end portion of one member being notched and adapted to pass through a slot provided in the proximate end of the adjacent member in the alignment, whereby to permit limited sliding contact of the respective ends of said members, and a connector element secured in position adjacent the interlaced ends of said members, said element being provided with flexible arms each of which is connected to the end of one of said members.

4. A guard of the class described, comprising a plurality of fixed supports, a plurality of impact members arranged in operative alignment between said supports, a spring element carried by each support and provided with spring wings, the end portion of each of the adjacently positioned members being connected to one of said wings, the end portion of one member being interlaced through the end portion of the other member.

5. A road guard, comprising a plurality of spaced supports, a series of sheet metal strips connected end to end to provide a substantially smooth continuous surface, means to secure the series wholly to one side of the supports and to maintain the respective strips under tension.

6. A road guard, comprising a plurality of spaced supports, a series of sheet metal strips connected end to end to provide a substantially smooth continuous surface, spring connectors to secure the ends of the adjacent strips together under tension and to the supports.

7. A road guard, comprising a plurality of spaced supports, a series of sheet metal strips, means for connecting said strips end to end to provide a substantially smooth continuous surface throughout the series and for connecting the strips to the supports under tension.

8. A road guard, comprising a series of sheet metal strips overlapping end to end and spring connectors between said ends for imparting a longitudinal tension to the strips when the latter are attached to supports.

9. A road guard, comprising a plurality of spaced supports, a series of sheet metal strips overlapping end to end to provide a substantially smooth continuous surface, and spring connectors between said overlapping ends to impart a longitudinal tension to the series when the latter is connected to said supports.

10. A road guard, comprising a plurality of spaced supports, a sheet metal band extending longitudinally and wholly to one side thereof, and means for maintaining said band under longitudinal tension.

11. A traffic guard rail having a plane surface adapted to yield under force, to absorb shocks and to deflect traffic into its proper course, the guard rail comprising a plurality of sections, means for interlocking the sections together in such a manner that the ends of the rails extend inward from the operating surface, the means consisting of a resilient element adapted to yield and absorb a portion of a shock against the guard and assist in distributing the force to other portions of the guard rail.

12. A traffic guard rail having a plane surface adapted to yield under force, to absorb shocks and to deflect traffic into its proper course, the guard rail comprising a plurality of sections, means for interlocking the sections together in such a manner that the ends of the rails extend inward from the operating surface, the means consisting of a resilient element adapted to yield and to absorb a portion of a shock against the guard and assist in distributing the force to other portions of the guard rail, supporting means for the resilient elements.

13. A traffic guard rail having a plane surface adapted to yield under force, to absorb shocks and to deflect traffic into its proper course, the guard rail comprising a plurality of sections, means for interlocking the sections together in such a manner that the ends of the rails extend inward from the operating surface, the means consisting of a resilient element adapted to yield and to absorb a portion of a shock against the guard and assist in distributing the force to other portions of the guard rail, supporting means for the resilient elements, the guard rails being supported in self-aligning manner by the resilient members.

14. A traffic guard rail having a plane surface adapted to yield under force, to absorb shocks and to deflect traffic into its proper course, the guard rail comprising a plurality of sections, means for interlocking the sections together in such a manner that the ends of the rails extend inward from the operating surface, the means consisting of a resilient element adapted to yield and to absorb a portion of a shock against the guard and assist in distributing the force to other portions of the guard rail, supporting means for the resilient elements, the guard rails being supported in self aligning manner by the resilient members, means for interlocking the resilient elements and guard rails together, comprising notches and slots in the rails and hook portions on the resilient elements.

15. A traffic guard rail having a plane surface adapted to yield under force, to absorb shocks and to deflect traffic into its proper course, the guard rail comprising a plurality of sections, means for interlocking the sections together in such a manner that the ends of the rails extend inward from the operating surface, the means consisting of a resilient element adapted to yield and to absorb a portion of a shock against the guard and assist in distributing the force to other portions of the guard rail, supporting means for the resilient elements, the guard rails being supported in self-aligning manner by the resilient members, means for interlocking the resilient elements and guard rails together, comprising notches and slots in the rails and hook portions on the resilient elements, thereby providing means for maintaining the guard rails under tension for absorbing shock and compensate for changes in lengths of rails due to expansion and contraction caused by variations in atmospheric temperatures.

In testimony whereof I affix my signature.

EUGENE V. CAMP.